United States Patent
Matsukawa et al.

(10) Patent No.: US 6,803,951 B1
(45) Date of Patent: Oct. 12, 2004

(54) APPARATUS AND METHOD FOR VIDEO IMAGE INFORMATION PROCESSING

(75) Inventors: Nobuyuki Matsukawa, Kanagawa-ken (JP); Takehiko Kuhara, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 799 days.

(21) Appl. No.: 09/645,335

(22) Filed: Aug. 25, 2000

(30) Foreign Application Priority Data

Sep. 3, 1999 (JP) .......................................... P11-250641

(51) Int. Cl.[7] .................................................. H04N 5/76
(52) U.S. Cl. .................................. 348/231.99; 348/283
(58) Field of Search ............................. 348/231.99, 283

(56) References Cited

U.S. PATENT DOCUMENTS 5,280,430 A * 1/1994 Woods et al. ................ 715/531
5,576,760 A * 11/1996 Akiyama ............... 348/231.99

FOREIGN PATENT DOCUMENTS

| JP | 07-007657 | 1/1995 |
|----|-----------|--------|
| JP | 07-250266 | 9/1995 |
| JP | 10-066095 | 3/1998 |
| JP | 11-098469 | 4/1999 |

* cited by examiner

Primary Examiner—Andrew Christensen
Assistant Examiner—Dorothy Wu
(74) Attorney, Agent, or Firm—Nath & Associates PLLC; Marvin C. Berkowitz

(57) ABSTRACT

In a digital video camera unit wherein its CCD outputs an image pickup signal with an odd line and an even line in the 1HD period to convert the image pickup signal to luminance signal and color signal, a line memory portion for separating each line of two image pickup signals existing in the 1HD period to two lines, an address controller and a control circuit for controlling write/read into the line memory portion are provided. At the time of write to the line memory portion, an analog delay amount is absorbed in order to output signals at the same timing as design time upon reading. By changing the write/read frequency with respect to the line memory portion, signals of different frequencies can be processed in a single circuit.

4 Claims, 4 Drawing Sheets

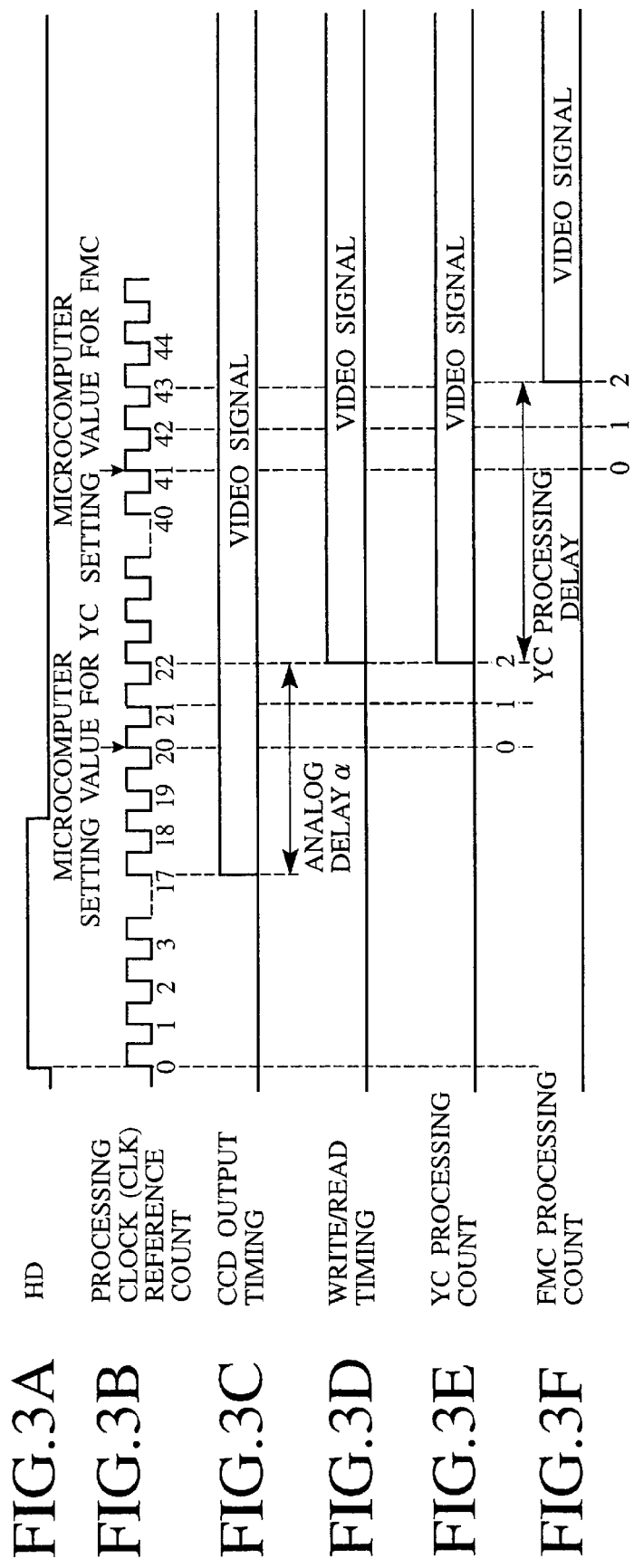

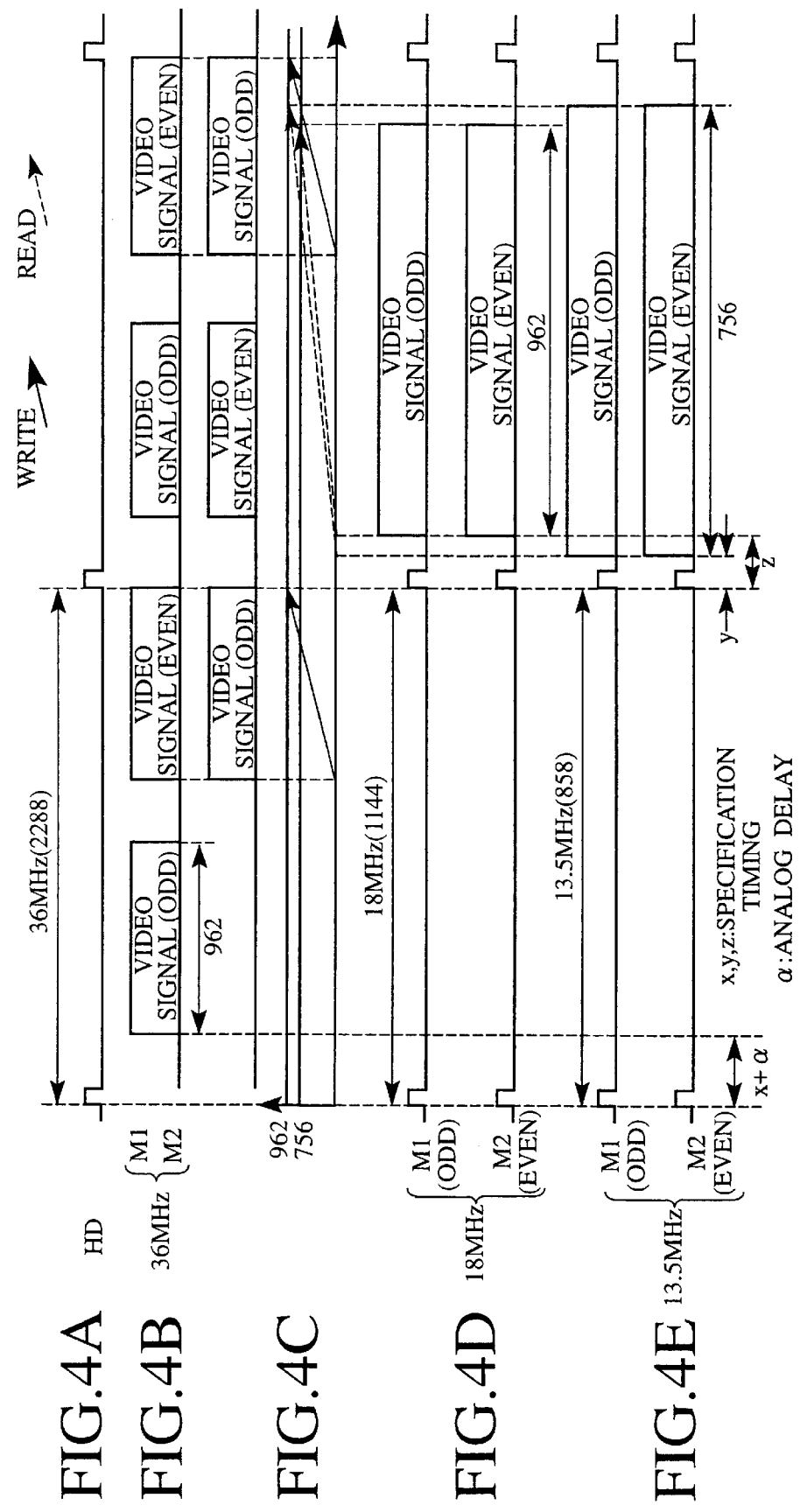

APPARATUS AND METHOD FOR VIDEO IMAGE INFORMATION PROCESSING

BACKGROUND OF THE INVENTION

1. Field of the Invention

The present invention relates to a video image information processing apparatus preferable for being equipped on, for example, digital video camera and the like, and more particularly to a video image information processing apparatus and video image information processing method wherein by providing with a memory means for memorizing video image information sent from an image pickup means such as solid-state image sensing device (e.g. Charge Coupled Device (CCD)) or the like temporarily and controlling a write timing for writing the video image information to this memory means, it is intended to cancel a delay in information processing generated between the image pickup means and the information processing means.

2. Description of the Related Art

Conventionally, a digital video camera which handles video signals generated by taking pictures of an object using, for example, the solid-state image sensing device (e.g. Charge Coupled Device (CCD)) in digital manner has been well known. A schematic construction of this digital video camera is as shown in FIG. 1. More specifically, an image pickup beam corresponding to an object impinges upon a CCD 102 through an optical lens 101.

The CCD photoelectrically converts the impinging image pickup beam to form signal charge and accumulates this. This signal charge is read out according to output timing signal supplied from a timing generator 110 and supplied to a CDS.AGC circuit 103 as an image pickup signal.

The CDS.AGC circuit 103 carries out correlated double sampling (CDS) processing and automatic gain control (AGC) processing on the image pickup signal from the CCD 102 and supplies this to the A/D converter 104 (analog/digital). The A/D converter 104 digitizes this image pickup signal to form image pickup data and supplies this to a signal processing circuit 105 composed of for example, digital signal processor (DSP) and the like.

Here, so-called frame transfer type in which the CCD reads out two lines at the same time and outputs an image pickup signal of a frame in a period of 1/60 sec has been well known. If a description is progressed assuming that this frame transfer type CCD is provided as the aforementioned CCD, it comes that the aforementioned image pickup data of two lines are supplied from the CCD 102 to the signal processing circuit 105 at the same time.

The signal processing circuit 105 comprises a Y/C separating circuit 121 (luminance/color separating circuit), a field memory controller 122 (FMC) having a field memory for storing luminance data Y and color data C, and the like. The image pickup data of two lines inputted at the same time is separated to luminance data Y and color data C subjected to signal processing by the Y/C separating circuit 121 and the two lines are supplied to the FMC 122 at the same time.

The FMC 122 controls write and read of the luminance data Y and color data C into the field memory based on a line address signal supplied from the address controller 111 under a control of the control circuit 112 (CPU). The luminance data Y and color data C read out from the respective field memories of the FMC 122 are supplied to data processing system of subsequent stage (not shown) such as a recording block and external output block through an output terminal 106 and an output terminal 107.

In the digital video camera unit shown in FIG. 1, read-out control of the CCD 102 by means of a timing generator 110, Y/C separating processing in the Y/C separating circuit 121 of the signal processing circuit 105, memory control in the FMC 122 and the like are carried out with HD signal (horizontal synchronous signal) and VD signal (vertical synchronous signal) generated by the SSG (synchronous signal generating portion) 123 in the signal processing circuit 105.

Here, an operating timing of each portion of the conventional digital video camera unit shown in FIG. 1 will be described taking an example of processing in the horizontal direction as an example.

In the horizontal direction processing, at which clock from a rise of the HD signal an image pickup signal is read out from the CCD 102, how many clocks of delay occur when that image pickup signal is subjected to Y/C separating processing and how many clocks of delay occur when a signal is inputted to the field memory control portion 122 are evident on a design stage.

Thus, a reference signal for processing based on the HD signal and VD signal, that is, a reference count acting as a criterion for the Y/C separating processing, memory control processing in the FMC 122 and the like can be set up base on clock delay information known at the time of design. Therefore, if the reference count acting as criterion for the Y/C separating processing, remote control processing in the FMC 122 and the like is set up by means of a microcomputer or the like, the digital video camera unit is capable of carrying out the Y/C separating processing, memory control processing and the like in which the clock delay is compensated.

However, on the other hand, a signal delay amount (analog delay amount) in an analog path from the CCD 102 to an input stage of an A/D converter 104 through the CDS.AGC circuit 103 is not evident on the design stage. That is, the analog delay amount mentioned here means a delay amount generated by analog devices (analog devices constituting mainly CDS.AGC circuit 103) on the analog path. Because the characteristics of the respective analog devices composing the analog path deviate minutely, it is difficult to control the analog delay amount preliminarily at the time of design.

Thus, the analog delay amount has to be measured (recognized) using an individual digital video camera unit (actual machine) produced actually.

Further, after the analog delay amount is measured using the actual machine as described above, it is necessary to set up the aforementioned reference count set up by the microcomputer again in order to absorb the measured analog delay amount. This fact complicates production process and adjustment process of the digital video camera units, which is an obstacle against a demand for reducing production cost.

Generally, in various products, the specifications of individual parts used in the products are often changed even after its design is completed and the same thing happens in the digital video camera unit. For example, if in the digital video camera unit shown in FIG. 1, the reading method of the CCD 102 is changed due to technical progress or change of use purpose, the signal processing circuit 105 which coincides with the design specification originally sometimes becomes incapable of coinciding with the changed reading method. More specifically, in case where the CCD 102 which reads out two lines at the same time is changed to a CCD type which reads out a single line, the signal processing circuit 105 of the type for reading out two lines at the same time is not capable of corresponding to such a change.

Thus, if it is intended to change the CCD reading method from the two-line simultaneous reading method to the single line reading method, the signal processing circuit has to be changed corresponding to that reading method change. Thus, because the structure of the signal processing circuit has to be changed largely, there is a fear that production cost may increase due to procurement of new components, change in production process and the like. Although it can be considered to provide with a signal processing circuit capable of corresponding to various reading methods of the CCD, the signal processing circuit of this case becomes a very special one, so that necessarily the price increases, which is not favorable.

Further, if the driving frequency of the CCD 102 is changed, the operating frequency of the signal processing circuit 105 has to be changed correspondingly. In this case, not only the signal processing circuit 105 but also the entire design has to be reviewed so that a large scale change of the structure is needed. For this reason also, there is a fear that production cost may increase because of procurement of new parts, change of production process and the like.

SUMMARY OF THE INVENTION

Accordingly, the present invention has been achieved in views of the above described problems and therefore, it is an object of the invention to provide a video image information processing apparatus and video image information processing method capable of correcting (absorbing) a delay in the analog path easily and not necessitating any change in the signal processing circuit even if the CCD reading method or driving frequency is changed, thereby preventing complex of the adjustment process and production process and achieving a low production cost.

To achieve the above object, according to an aspect of the present invention, there is provided a video image information processing apparatus comprising: a memory means for memorizing image pickup information outputted from an image pickup means temporarily; an information processing means for carrying out a predetermined information processing on image pickup information read out from the memory means at a preliminarily set up timing; and a control means for controlling to write an image pickup signal from the image pickup means into the memory means so as to cancel a delay amount generated until the image pickup information is supplied from the image pickup means to the information processing means and controlling to read the image pickup signal written in the memory means based on the timing set up in the information processing means.

According to the present invention, it is possible to correct (absorb) a delay in the analog path from the picture taking means to the information processing means without changing the information processing means. As a result, the complex of the adjustment process and production process can be prevented thereby achieving a low production cost.

Specifically, although conventionally, several circuits corresponding to the analog delay are necessary, the video image information processing apparatus of the present invention is capable of absorbing the analog delay by means of a single analog delay corresponding circuit. Thus, the circuits can be reduced in number and its setting value can be simplified.

According to a preferable embodiment, the memory means memorizes the image pickup information of at least n lines (n: natural number of 2 or more), outputted from said image pickup means by each line, and said information processing means carries out the predetermined signal processing on the image pickup information of n lines read out from said memory means by said control means.

According to this embodiment, the information processing means does not have to be changed even if the reading method of the image pickup means is changed, thereby preventing complex of the adjustment process and production process and achieving a low cost.

More specifically, in case where an information processing means (IC) for carrying out two-line simultaneous processing corresponding to the image pickup device (CCD) which reads two lines at the same time, for example, as the aforementioned image pickup means is used, even if the reading method of the image pickup device is changed to one-line reading method, the number of the lines can be changed so as to enable the two-line simultaneous processing with the information processing means. As a result, general purpose performance of the information processing means (IC) for the special two line simultaneous processing can be intensified.

According to a preferred embodiment of the present invention, the control means controls to read out the image pickup information written in the memory means at a reading frequency different from a write frequency for controlling to write the image pickup information into the memory means.

According to this embodiment, even if the driving frequency of the image pickup means is changed, the information processing means does not have to be changed, thereby preventing complex of the adjustment process and production process and achieving a low cost.

Further, the write frequency and read frequency to the aforementioned memory means can be changed, so that multiple frequency conversion processings can be carried out with a single circuit. Further, by using the pixel cut-out method for the frequency conversion processing, the present invention can be applied to the estimated camera shake correction or the like.

Further, to achieve the above object, according to another aspect of the present invention, there is provided an image pickup information processing method comprising the steps of: memorizing image pickup information outputted from an image pickup means temporarily; carrying out a predetermined information processing on image pickup information read out from the memory means at a preliminarily set up timing; and controlling to write an image pickup signal from the image pickup means into the memory means so as to cancel a delay amount generated until the image pickup information is supplied from the image pickup means to the information processing means and controlling to read the image pickup signal written in the memory means based on the timing set up in the information processing means.

According to the present invention, the delay generated in the analog path from the image pickup means to the information processing means can be corrected (absorbed) without changing the information processing means. As a result, the complex of the adjustment process and production process can be prevented, thereby achieving a low cost.

More specifically, although conventionally, multiple corresponding circuits to the analog delay are necessary, in the video image information processing apparatus of the present invention, it is possible to absorb the analog delay with a single analog delay corresponding circuit. Thus, the required circuits can be reduced in number and its setting value can be simplified.

The nature, principle and utility of the invention will become more apparent from the following detailed description when read in conjunction with the accompanying drawings.

BRIEF DESCRIPTION OF THE DRAWINGS

In the Accompanying Drawings

FIG. 3 is a wave form diagram for use in explaining an operation for enabling correction of analog delay generated in an analog path by means of a line memory portion in a digital video camera unit of this embodiment; and FIG. 4 is a diagram for use in explaining an operation for enabling frequency conversion using a line memory portion in case where CCD readout frequency is different from an operating frequency of the signal processing circuit in the digital video camera unit of this embodiment.

DESCRIPTION OF THE PREFERRED EMBODIMENTS

Figure 1:
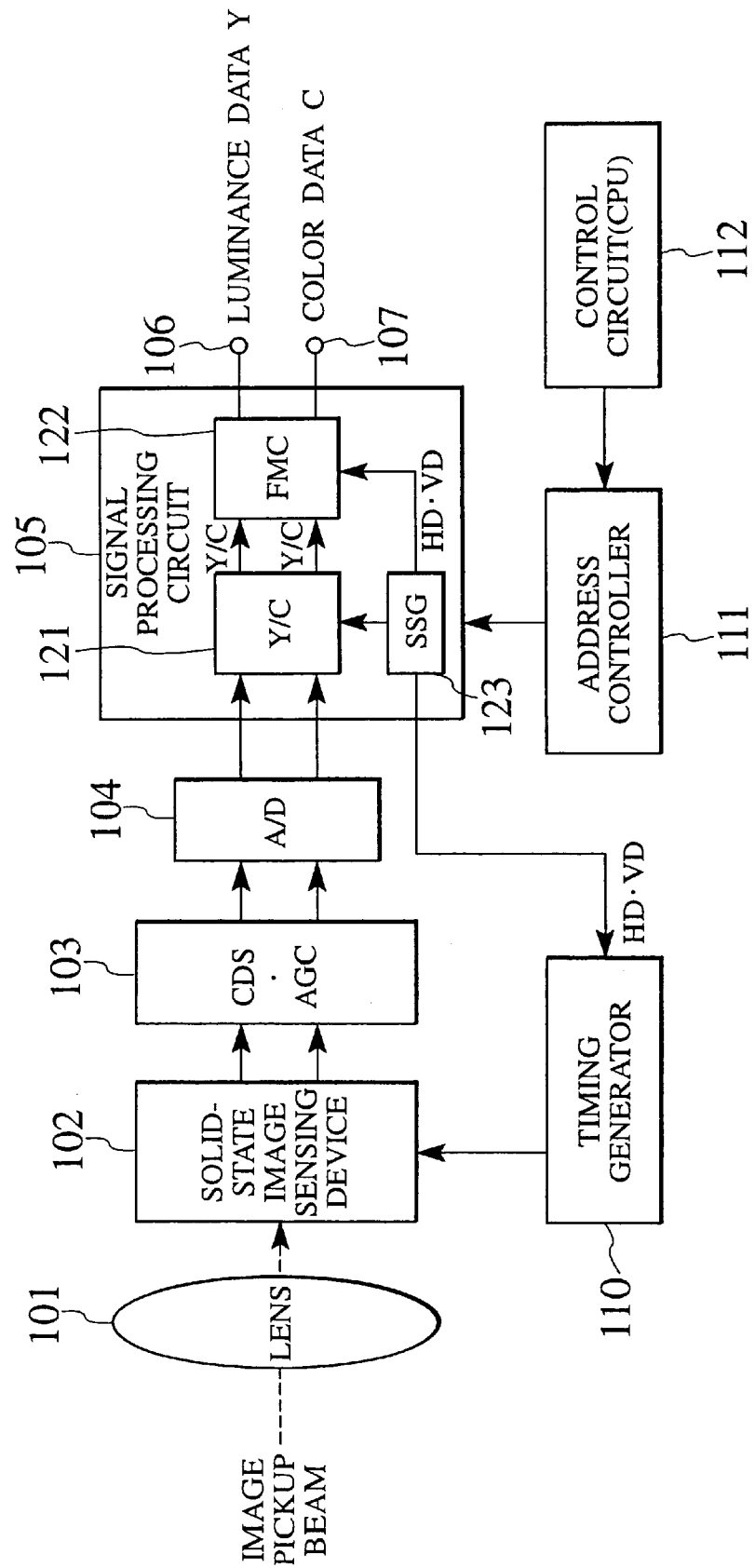
FIG. 1 is a block diagram of a conventional digital video camera unit.
Figure 2:
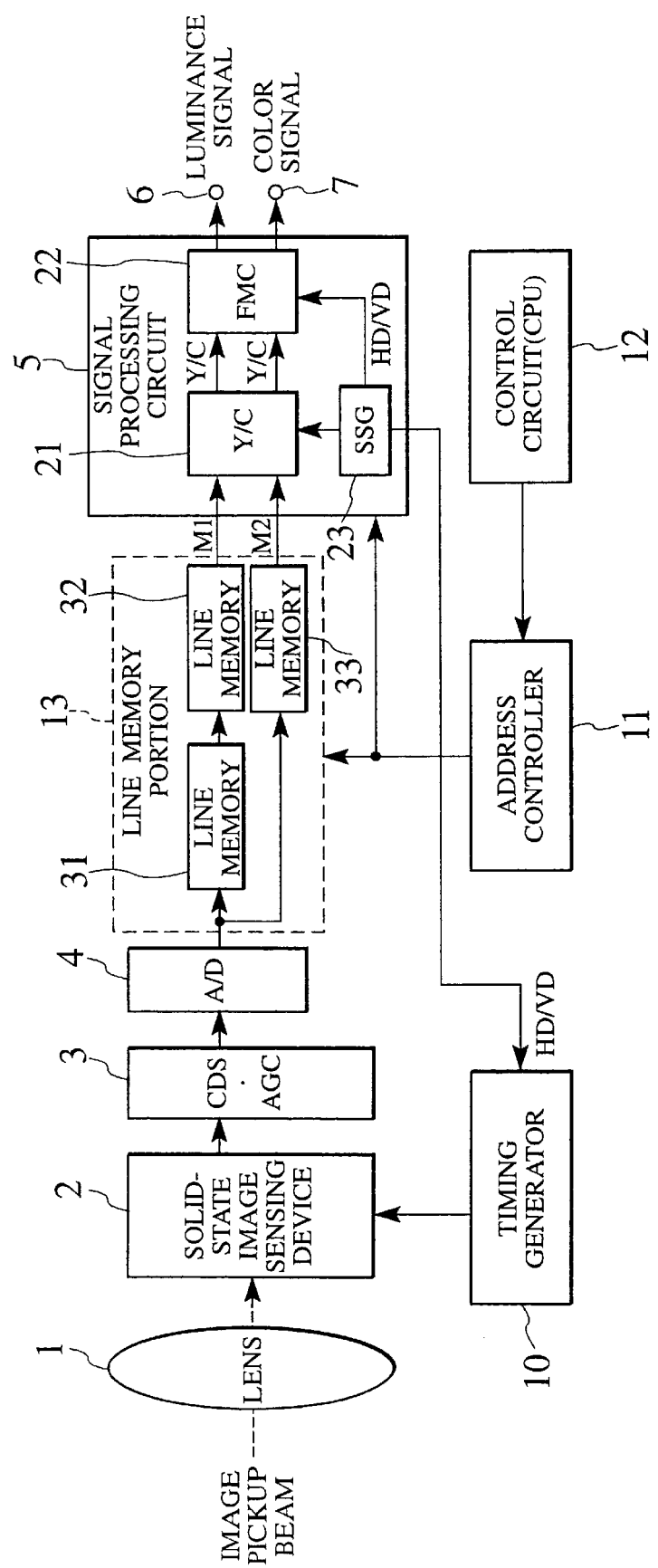
FIG. 2 is a block diagram of a digital video camera of an embodiment in which the video image information processing apparatus and method of the present invention are applied.

The apparatus and method for video image information processing of the present invention can be applied to the digital video camera unit shown in FIG. 2. In the digital video camera unit of this embodiment, an image pickup beam from an object impinges upon a solid-state image sensing device (e.g. Charge Coupled Device (CCD)) 2 through an optical lens 1. This CCD 2 is driven to read out data of two lines in a single horizontal period (1HD period). If using one other than the CCD as the solid-state image sensing device, a MOS type solid-state image sensing device may be used.

The CCD 2 accumulates signal charge by photoelectrically converting the impinging image pickup beam, reads the signal charge corresponding to an output timing signal from a timing generator 10 and supplies this signal to the CDS.AGC circuit 3 as the image pickup signal. The CDS.AGC circuit 3 carries out correlated double sampling processing and automatic gain control processing on the image pickup signal from the CCD 2 and supplies this to the A/D converter 4 (analog/digital).

The A/D converter 4 digitizes the supplied image pickup signal to form image pickup data. This image pickup data is supplied to a signal processing circuit 5 composed of DSP and the like through a line memory portion 13 composed of line memories 31, 32, 33. In this case, the signal processing circuit 5 carries out signal processing for two lines at the same time about the image pickup data of the two lines supplied at the same time.

The image pickup data of two lines supplied to the signal processing circuit 5 at the same time is supplied to a luminance/color separating portion 21 (Y/C separating portion). The Y/C separating portion 21 separates the image pickup data of two lines to luminance data Y and color data C and supplies two line data to a field memory controller 22 (FMC) at the same time.

The FMC 22 contains a field memory for storing luminance data Y and color data C, a memory controller for controlling write and read into/from the field memory and the like. Under a control of a control circuit 12 (CPU), the memory controller controls write and read of luminance data Y and color data C into/from the field memory based on line address signal supplied from an address controller 11.

The luminance data Y and color data C outputted from the FC 22 are supplied to data processing system of subsequent stages, for example, recording block, external output block and or the like through corresponding output terminals 6, 7 as the video signal.

In the digital video camera unit of this embodiment, generation of output timing signal for the CCD by the timing generator 10, Y/C separation processing by the signal processing circuit 5, memory control of the FMC 22 and the like are carried out with the horizontal synchronous signal (HD signal) and vertical synchronous signal (VD signal) generated by the synchronous signal generating portion 23 (SSG) as a reference signal.

Here, the digital video camera unit of this embodiment comprises a line memory portion 13 as a main component for absorbing the aforementioned analog delay generated by an analog path such as the CDS.AGC circuit 3 and the like, enabling a supply of the image pickup data of two lines at the same time to the signal processing circuit 5 even if a CCD which reads a single line is applied as the CCD 2, and eliminating the necessity of changing the operating frequency of the signal processing circuit 5 even if the driving frequency of the CCD 2 is changed. This line memory portion 13 controls write and read of the line memories 31, 32, 33 based on a line address signal generated from the address controller 11 based on a control of the control circuit 12.

First, an operation which enables a supply of the image pickup data of two lines at the same time to the signal processing circuit 5 by controlling the write and read into/from the respective line memories 31, 32, 33 using the line memory portion 13 even if the CCD which reads a single line as the CCD 2 is applied will be described as follows. In a following description, signals of respective lines outputted from the CCD 2 are called first output line, second output line, third output line, . . . .

That is, if a CCD which drives so as to read out two line data in the form of a single line in a horizontal period (1HD period) as the CCD 2, an image pickup signal of the first output line outputted from the CCD 2 is supplied to a line memory 31 and a line memory 33 of the line memory portion 13. At this time, the control circuit 12 controls so as to write the image pickup data of the first output line to, for example, the line memory 31 and the line memory 33 by controlling the address controller 11.

When the image pickup signal of the second output line is outputted from the CCD 2 and then, the image pickup data of the second output line is supplied to the line memory portion 13, the control circuit 12 controls so as to read out the image pickup data of the first output line memorized in the line memory 31 and the line memory 33 through the address controller 11. In this case, the image pickup data of the first output line read out from the line memory 31 is transferred to the line memory 32 and stored therein and the image pickup data of the first output line read from the line memory 33 is supplied to the signal processing circuit 5. After the image pickup data of the first output line is read out, the image pickup data of the second output line is accumulated in the line memory 31 and the line memory 33.

Next, if the image pickup signal of the third output line is outputted from the CCD 2 and the image pickup data of the third output line is supplied to the line memory portion 13, the control circuit 12 controls so as to read the image pickup data of the respective output lines stored in the line memories 31, 32, 33 through the address controller 11.

In this case, the image pickup data of the first output line read out from the line memory 32 is supplied to the signal processing circuit 5 and the image pickup data of the second output line read out from the line memory 33 is supplied to the signal processing circuit 5. After the image pickup data of the first output line is read out, the image pickup data of the second output line read out from the line memory 31 is transferred to and memorized in the line memory 32. After the image pickup data of the second output line is read out as described above, the image pickup data of the third output line is memorized in the line memory 31 and the line memory 33.

Next, when the image pickup signal of the fourth output line is outputted from the CCD 2 and the image pickup data of the fourth output line is supplied to the line memory portion 13, the control circuit 12 controls so as to read out the image pickup data of each output line stored in the line memories 31, 32, 33 through the address controller 11.

In this case, the image pickup data of the second output line read from the line memory 32 is supplied to the signal processing circuit 5 and the image pickup data of the third output line read from the line memory 33 is supplied to the signal processing circuit 5. Further, after the image pickup data of the second output line is read out, the image pickup data read from the line memory 31 is transferred to and memorized in the line memory 32. After the image pickup data of the third output line is read out, the image pickup data of the fourth output line is memorized in the line memory 31 and the line memory 33. Meanwhile, the same operation as described above is repeated for the fifth output line and following lines.

In the digital video camera unit of this embodiment, because the line memory portion 13 is used and the control circuit 12 controls the write timing and read timing of the respective line memories 31, 32, 33, even if the CCD which reads out a single line as the CCD 2 is employed, the image pickup data of two lines can be supplied to the signal processing circuit 5 at the same time. In other words, even if the CCD which reads a line is employed as the CCD 2, the signal processing circuit 5 corresponding to only the simultaneous processing for two lines can be employed.

Thus, even if the specification of the CCD is changed from a CCD for reading two lines at the same time to a CCD for reading a single line, it is possible to coincide with such an event easily. Further, a special signal processing circuit for the simultaneous processing for two lines can be generally used regardless of the specification of the CCD. Therefore, if the specification of the CCD is changed, a change of the structure to a large extent, procurement of new components, change of production process and the like are not necessary. Further, a special signal processing circuit corresponding to both the one-line processing and two-line simultaneous processing is not necessary, so that an increase of production cost upon change of the specification can be suppressed.

Although a configuration of two systems composed of a system consisting of the line memories 31, 32 and a system consisting of the line memory 33 is taken as an example of the line memory portion 13, the number of the systems can be increased (for example, n systems). Even if the number of the systems is increased like this example, one-line output from the CCD can be supplied to the signal processing circuit 5 as the image pickup output of multiple lines (n lines).

Next, an operation for absorbing (correcting) the aforementioned analog delay, which is generated in such an analog circuit as the CDS.AGC circuit 3, by controlling write and read on the line memories 31, 32, 33 of the line memory portion 13 in the digital video camera unit of this embodiment will be described with reference to FIGS. 3A–3F.

FIG. 3A shows HD signal generated by a SSG portion 23, FIG. 3B shows processing clock based on the HD signal and its count value (called reference count value), FIG. 3C shows output timing of the CCD 2 and corresponding video signal (image pickup data), FIG. 3D shows write/read timing of respective line memories of the line memory portion 13 and corresponding video signal (image pickup data), FIG. 3E shows processing count value (called YC processing count value) of the Y/C separating portion 21 and corresponding video signal (image pickup data), and FIG. 3F shows processing count value (called FMC processing count value) of the FMC 22 and corresponding video signal (image pickup data).

In FIGS. 3A–3F, the output timing from the CCD 2 is determined depending on the specification of the timing generator 10 and more specifically, determined by the timing generator 10 based on a rise timing of the HD signal. Further, the reference count value is reset by a rise of the HD signal, the YC processing count value is reset by a setting value (called microcomputer setting value for YC) of the microcomputer, for example and the FMC processing count value is similarly by setting of a setting value (called microcomputer setting value for FMC) of the microcomputer. The microcomputer setting value for YC and the microcomputer setting value for FMC are determined upon design corresponding to an output timing of the image pickup signal outputted from the CCD 2.

That is, the output timing from the CCD 2, reset timing (microcomputer setting value for YC) of YC processing count value, and reset timing (microcomputer setting value for FMC) of FMC processing count value can be determined preliminarily because as described above, at which clock from a rise of the HD signal (that is, which count of the reference count value) the image pickup signal is read out from the CCD 2, at which clock (which count of the reference count value) the Y/C separating processing for that image pickup signal is carried out and at which clock (which count of the reference count value) the memory control processing is carried out are known as digital delay information at the time of design.

If the analog delay generated in the analog path of the CDS.AGC circuit 3 or the like is a as shown in FIG. 3, the aforementioned conventional digital video camera unit has to be set so that the timings of the Y/C separating processing and memory control processing in the signal processing circuit of a subsequent stage are shifted by that analog delay amount α.

That is, assuming that the microcomputer setting value for YC is 20 as shown in FIG. 3, the aforementioned conventional digital video camera unit has to be set so that the timing of luminance/color processing is delayed by a count value (YC processing count value) (20+α) which is the microcomputer setting value for YC plus the analog delay amount α. Further, assuming that the microcomputer setting value for FMC is 41 as shown in FIG. 3, the aforementioned conventional digital video camera unit has to be set so that the timing of the memory control processing is delayed by a count value (FMC processing count value) (41+α) which is the microcomputer setting value for FMC plus that analog delay amount α.

On the contrary, for the timings for the luminance/color processing and memory control processing in the digital video camera unit of this embodiment, that analog delay amount α is absorbed (corrected) by controlling the write/read timings to the respective line memories 31, 32, 33 of the line memory portion 13.

That is, the write timing of the respective line memories 31, 32, 33 of the line memory portion 13 provided on a preceding stage of the signal processing circuit 5 is delayed corresponding to the analog delay amount α and on the other hand, the read timing is set as the specification specified so as to absorb the analog delay amount α.

More specifically, the control circuit 12 controls the address controller 11 so that the write timing of the line memories 32, 33 of the line memory portion 13 is set (delayed) corresponding to the analog delay amount α. As a result, the analog delay amount α is absorbed.

As described above, in the digital video camera unit of this embodiment, only the write timing of the respective line memories 31, 32, 33 of the line memory portion 13 is set corresponding to the analog delay amount α and the read timing is set as the specification specifies. The microcomputer setting value for YC, microcomputer setting value for FMC and the like are available as a set value upon design. As a result, the resetting of the processing reference pulse which serves as criterion for the Y/C separating processing, memory control processing and the like, already set up by the microcomputer to absorb the analog delay α can be made unnecessary. Therefore, absorption of the analog delay α can be carried out at a low cost without increasing the number of the production processes and adjustment processes of the video camera unit.

Next, by controlling the write and read of the line memories 31, 32, 33 of the line memory portion 13 in the digital video camera unit of this embodiment, even if for example, the driving frequency of the CCD 2 is changed, eliminating the necessity of changing the operating frequency of the signal processing circuit 5 and the like will be described with reference to FIGS. 4A–4E.

FIG. 4A shows the HD signal generated by a SSG portion 23 and FIG. 4B shows output signal M1 and output signal M2 generated when the line memory 31 of the line memory portion 13 reads out at the frequency of 36 MHz and the line memories 32, 33 read out at a frequency produced by converting that frequency, after an image pickup signal read out from the CCD 2 at a reading frequency of 36 MHz is written into the line memory portion 13 at the frequency of 36 MHz.

FIG. 4C shows a number of effective pixels (962 pixels and 756 pixels which will be described later) read out within a single line, and FIG. 4D shows output signals M1 and M2 of odd line (ODD) and even line (EVEN) when the line memories 32, 33 of the line memory portion 13 reads out at a reading frequency of 18 MHz in the 1 HD period after the image pickup data read out from the CCD 2 at the reading frequency of 36 MHz is written into the line memory portion 13 at the frequency of 36 MHz.

FIG. 4E shows output signals M1, M2 of odd line (ODD) and even line (EVEN) when the line memories 32, 33 of the line memory portion 13 reads out at the reading frequency of 13.5 MHz in the 1HD period after the image pickup data read out from the CCD 2 at the reading frequency of 36 MHz is written into the line memory portion 13 at the frequency of 36 MHz.

In FIGS. 4A–4E, if the image pickup signal outputted from the CCD 2 in the 1HD period of the reading frequency of 36 MHz exists as data of two images of odd line (ODD) and even line (EVEN), the control circuit 12 controls so as to write to the line memory portion 13 at the frequency of 36 MHz. The odd line (ODD) and even line (EVEN) of the image pickup data to be written into the line memory portion 13 have 962 pixels as valid pixels.

On the other hand, the control circuit 12 controls so as to read out the image pickup data (962 pixels) of each line in a period of 18 MHz as shown in FIG. 4D when reading from the line memory portion 13.

That is, if data readout is intended in the period of 18 MHz which is half of 36 MHz to the line memory portion 13 in which data of two images of odd line (ODD) and even line (EVEN) are written by the frequency of 36 MHz at the time of write, image pickup data (962 pixels.) of a single image of only odd line (ODD) or even line (EVEN) is outputted.

Consequently, image pickup data (962 pixels) of two lines composed of only odd lines (ODD) or even lines (EVEN) while each line forms one image is supplied to the signal processing circuit 5 from the line memory 13 at the same time. Further, the image pickup signal read out from the CCD 2 in the frequency of 36 MHz is converted to the frequency of 18 MHz and supplied to the signal processing circuit 5.

If the image pickup data of each line is read out in the period of 13.5 MHz as shown in FIG. 4E when reading out from the line memory portion 13, the image pickup data of an image composed of only the odd lines (ODD) or even lines (EVEN) is outputted. When the image pickup data is read out from the line memory portion 13 in the period of 13.5 MHz, data of 756 pixels is cut out from valid 962 pixels memorized in the line memory portion 13 and read out.

Consequently, the image pickup data (756 pixels) of two lines composed of only odd lines (ODD) or even lines (EVEN) while each line forms one image is supplied from the line memory portion 13 to the signal processing circuit 5 at the same time. Further, the image pickup signal read out from the CCD 2 at the frequency of 36 MHz can be converted to the frequency of 13.5 MHz and supplied to the signal processing circuit 5 without deteriorating the quality of the image pickup signal.

A method for reading 756 pixels from 962 pixels memorized in the line memory portion 13 can be applied to predictive camera shake correcting technology or the like in which part of the entire image pickup region of the CCD is cut out depending on the manual deviation amount and direction of the deviation of the video camera unit.

As described above, the digital video camera unit of this embodiment writes image pickup data of two images of odd line and even line at the frequency of 36 MHz, which is a reading frequency of the CCD 2, to the line memory portion 13 and the image pickup data of a single image of odd line and even line is read out from the line memory portion 13 at the frequency of 18 MHz or 13.5 MHz. Consequently, even if the operating frequency of the CCD 2 is changed, it is possible to eliminate the necessity of changing the operating frequency, entire design and structure of the signal processing circuit 5. Further, it is possible to change the specification of the digital video camera unit without increasing production cost because of procurement of new components, change of production process and the like.

Finally, the above described embodiment is an example of the present invention. Therefore, the present invention is not restricted to the above described embodiments. For example, although, in the above description of the embodiments, the image pickup data is read out at the frequency of 18 MHz or 13.5 MHz from the line memory portion 13, the frequency of read from the line memory portion 13 may be changed. As a result, multiple. (for example, m frequencies) processings may be carried out. Further, it is permissible to increase the number of the line memories 13 to multiple systems (for example, n systems) at the same time when the read frequency from the line memory portion 13 is changed. Further, it is needless to say that various modifications are possible depending on design or the like within a range not departing from technical spirit of the present invention.

What is claimed is:

1. A video image information processing apparatus comprising:

an image pickup means;

a first signal processing means for carrying out an analog signal processing on an image pickup signal outputted from said image pickup means;

an analog/digital conversion means for converting an analog signal outputted from said first signal processing means into a digital signal;

a memory means for memorizing the digital signal outputted from said analog/digital conversion means temporarily;

a second signal processing means for carrying out a signal processing on the digital signal read out from said memory means; and a control means for controlling at least one of write timing and read timing for the digital signal into/from said memory means so as to cancel a delay amount of the analog signal generated in a section between said image pickup means and said analog/digital conversion means.

2. A video image information processing apparatus according to claim 1 wherein said memory means memorizes the digital signal of at least n lines (n: natural number of 2 or more), outputted from said analog/digital conversion means by each line, and said second signal processing means carries out the signal processing simultaneously on the digital signal of n lines read out from said memory means by said control means.

3. A video image information processing apparatus according to claim 1 wherein said control means controls to read out the digital signal written in the memory means at a reading frequency different from a write frequency for controlling to write the digital signal into said memory means.

4. An image pickup information processing method comprising the steps of:

obtaining an image pickup signal from an image pickup means;

carrying out an analog signal processing on the image pickup signal obtained by said obtaining step;

converting an analog signal generated by said analog signal processing step into a digital signal;

memorizing the digital signal generated by said conversion step into a memory means temporarily;

carrying out a signal processing on the digital signal read out from said memory means; and controlling at least one of write timing and read timing for the digital signal into/from said memory means so as to cancel a delay amount of the analog signal generated at steps between said obtaining step and said conversion step.

* * * * *